United States Patent
Chia

(10) Patent No.: US 9,736,559 B2
(45) Date of Patent: Aug. 15, 2017

(54) RING IN RING PASSIVE OPTICAL NETWORK SYSTEM FOR PROVIDING FIBER TO THE HOME WITH REDUCED NUMBER OF FIBERS

(71) Applicant: Cox Communications, Inc., Atlanta, GA (US)

(72) Inventor: Timothy Kai-Loh Chia, Irvine, CA (US)

(73) Assignee: Cox Communications, Inc., Atlanta, GA (US)

( * ) Notice: Subject to any disclaimer, the term of this patent is extended or adjusted under 35 U.S.C. 154(b) by 0 days.

(21) Appl. No.: 14/832,424

(22) Filed: Aug. 21, 2015

(65) Prior Publication Data

US 2015/0358701 A1 Dec. 10, 2015

Related U.S. Application Data

(62) Division of application No. 12/793,133, filed on Jun. 3, 2010, now Pat. No. 9,118,983.

(51) Int. Cl.
*H04B 10/20* (2006.01)
*H04Q 11/00* (2006.01)
*H04B 10/275* (2013.01)
*H04L 12/24* (2006.01)
*H04B 10/2575* (2013.01)

(52) U.S. Cl.
CPC ... *H04Q 11/0067* (2013.01); *H04B 10/25751* (2013.01); *H04B 10/2755* (2013.01); *H04L 41/0826* (2013.01); *H04B 10/25755* (2013.01); *H04L 41/32* (2013.01); *H04Q 2011/0079* (2013.01); *H04Q 2011/0092* (2013.01)

(58) Field of Classification Search
CPC ....... H04Q 11/0067; H04Q 2011/0079; H04Q 2011/0092; H04B 10/25751; H04B 10/2755; H04B 10/25755; H04L 41/0826; H04L 41/32
USPC ..................................... 398/59, 45
See application file for complete search history.

(56) References Cited

U.S. PATENT DOCUMENTS

| | | | |
|---|---|---|---|
| 5,982,517 A | 11/1999 | Fishman | |
| 7,149,429 B2 | 12/2006 | Ufongene | |
| 7,308,198 B1 | 12/2007 | Chudak et al. | |
| 7,433,594 B2 | 10/2008 | Takachio et al. | |
| 7,450,846 B1 | 11/2008 | Frigo et al. | |
| 7,460,783 B2 | 12/2008 | Fumagalli et al. | |
| 8,447,181 B2 | 5/2013 | Jenkins et al. | |
| 9,118,983 B2 * | 8/2015 | Chia | H04Q 11/0067 |
| 2006/0188258 A1 | 8/2006 | Gumaste et al. | |
| 2007/0031146 A1 | 2/2007 | Takachio et al. | |
| 2008/0037988 A1 | 2/2008 | Bullock | |

(Continued)

*Primary Examiner* — M. R. Sedighian
(74) *Attorney, Agent, or Firm* — Merchant & Gould P.C.

(57) ABSTRACT

A mini-optical line termination (OLT) includes at least one management card for providing control and management functions. A plurality of network cards having a predetermined number of ports are configured to support a predetermined number of subscribers by providing a gigabit passive optical network to the subscribers. At least one network device is coupled to an upstream device and the plurality of network cards. The at least one network device is configured to control the forwarding of data between the upstream device and the subscribers.

11 Claims, 10 Drawing Sheets

(56) References Cited

U.S. PATENT DOCUMENTS

2009/0074413 A1* 3/2009 Bannai .................. H04L 12/42
                                                      398/59
2011/0110662 A1   5/2011 Wellbrock et al.
2011/0299851 A1  12/2011 Chia

* cited by examiner

RING IN RING PASSIVE OPTICAL NETWORK SYSTEM FOR PROVIDING FIBER TO THE HOME WITH REDUCED NUMBER OF FIBERS

CROSS-REFERENCE TO RELATED APPLICATIONS

The present application is a divisional of and claims priority to U.S. patent application Ser. No. 12/793,133, filed Jun. 3, 2010, now U.S. Pat. No. 9,118,983 entitled RING IN RING PASSIVE OPTICAL NETWORK SYSTEM FOR PROVIDING FIBER TO THE HOME WITH REDUCED NUMBER OF FIBERS, the disclosure of which is hereby incorporated by reference in its entirety.

FIELD OF THE INVENTION

This disclosure relates in general to hybrid fiber coaxial networks, and more particularly to a method that eliminates or greatly minimizes the investment necessary to build additional fiber to the home or to the network headend.

BACKGROUND

Telecommunication companies continue to invest in deploying new broadband networks to provide interactive services for entertainment, communication and lifestyle applications. However, as services and channels are added to existing networks, the available bandwidth can easily be exhausted. While there are multiple network structures capable of supporting broadband services, providers of such networks continue to study how to integrate and take advantage of fiber optic network structures. As a result, an ever increasing percentage of broadband providers are investing in fiber optic network structures to support both present and future bandwidth requirements.

Cable companies need a way to cost effectively extend fiber all the way to the home. A passive optical network (PON) is a network architecture that brings fiber cabling and signals to the home using a point-to-multipoint scheme that enables a single optical fiber to serve multiple premises. Encryption maintains data security in this shared environment. The architecture uses passive (unpowered) optical splitters, reducing the cost of equipment compared to point-to-point architectures.

The GPON (Gigabit passive optical network) standard differs from other PON standards in that it achieves higher bandwidth and higher efficiency using larger, variable-length packets. GPON offers efficient packaging of user traffic, with frame segmentation allowing higher quality of service (QoS) for delay-sensitive voice and video communications traffic.

Further, cable companies rely on third party technology partners to develop set top boxes (STBs) that can keep up with the demands. There may be a delay between the time the HFC is upgraded to provide 1 GHz bandwidth until third parties are able to provide the cable companies a set top box that functions at 1 GHz. Residential developers are also asking for cable companies to bring fiber straight to the home or to upgrade existing service. The problem with the traditional GPON architecture is that it does not take advantage of the fiber that is already in the ground. Rather, a lot of new fiber is required, which is problematic because often large construction projects are looking for a way to take advantage of the existing fiber that cable companies already have in place. The other issue with the existing GPON architecture is that the electronics for providing cable services are located in an existing facility or a new facility has to be built to house the equipment. Thus, there is a significant amount of infrastructure in the outside plant.

Accordingly, there is a need for a method that eliminates or greatly minimizes the investment necessary to build additional fiber to the home or to the network headend.

SUMMARY OF THE INVENTION

To overcome the limitations described above, and to overcome other limitations that will become apparent upon reading and understanding the present specification, embodiments for a method that eliminates or greatly minimizes the investment necessary to build additional fiber to the home or to the network headend are disclosed.

An embodiment includes a mini-optical line termination (OLT) that includes at least one management card for providing control and management functions, a plurality of network cards having a predetermined number of ports, the plurality of network cards configured to support a predetermined number of subscribers by providing a gigabit passive optical network to the subscribers and at least one network device, coupled to an upstream device and the plurality of network cards, the network device configured to control the forwarding of data between the upstream device and the subscribers.

In another embodiment, a ring-in-ring passive fiber optical network includes a headend for receiving and transmitting signals, at least one fiber optic ring comprising a predetermined number of fibers, wherein the at least one fiber optic ring comprising N fibers leaving the headend, a number of fibers being split at each ring junction and a plurality of mini-optical line terminations (OLTs) disposed within each ring, the plurality of mini-OLTs providing a ring-in-ring structure for servicing a predetermined number of subscribers. The plurality of mini-OLTs may each have at least M network cards for providing signals for N subscribers and M distributed passive optical network cards, coupled to the at least M network cards, for providing a fiber-to-the-home node, each of the M distributed passive optical network cards servicing $$\frac{M}{N}$$

subscribers.

In another embodiment, method for providing a ring-in-ring passive optical network system for fiber to the home using a reduced number of fibers includes replacing passive optical network cards in a hub with network uplink cards, providing passive optical network cards in a weather hardened device along with network cards, positioning the weather hardened device proximate to subscriber premises, coupling the network uplink cards to the weather hardened device in a ring configuration to provide signals to a first network card in the weather hardened device, providing the signals to the passive optical network cards provided in the weather hardened device via the first network card, arranging the passive optical network cards in a ring to the subscribers, providing signals from the passive optical network cards to the subscribers, returning signals from the subscribers to the passive optical network cards in the weather hardened device and providing the returned signals to a second network card via the passive optical network cards for forwarding back to the network uplink cards at the hub.

These and various other advantages and features of novelty are pointed out with particularity in the claims annexed hereto and form a part hereof. However, for a better understanding of the disclosed embodiments, the advantages, and the objects obtained, reference should be made to the drawings which form a further part hereof, and to accompanying descriptive matter, in which there are illustrated and described specific examples of the disclosed embodiments.

BRIEF DESCRIPTION OF THE DRAWINGS

Referring now to the drawings in which like reference numbers represent corresponding parts throughout.

DETAILED DESCRIPTION

Embodiments of the present invention are directed to a method that eliminates or greatly minimizes the investment necessary to build additional fiber to the home or to the network headend. The GPON network according to an embodiment of the invention uses existing fiber rings. A mini optical line termination (OLT) device is used to host GPON. The architecture therefore eliminates the investment necessary to build additional fiber from the network headend to the neighborhood. Instead, GPON according to an embodiment of the invention takes advantage of the existing infrastructure.

Figure 1:
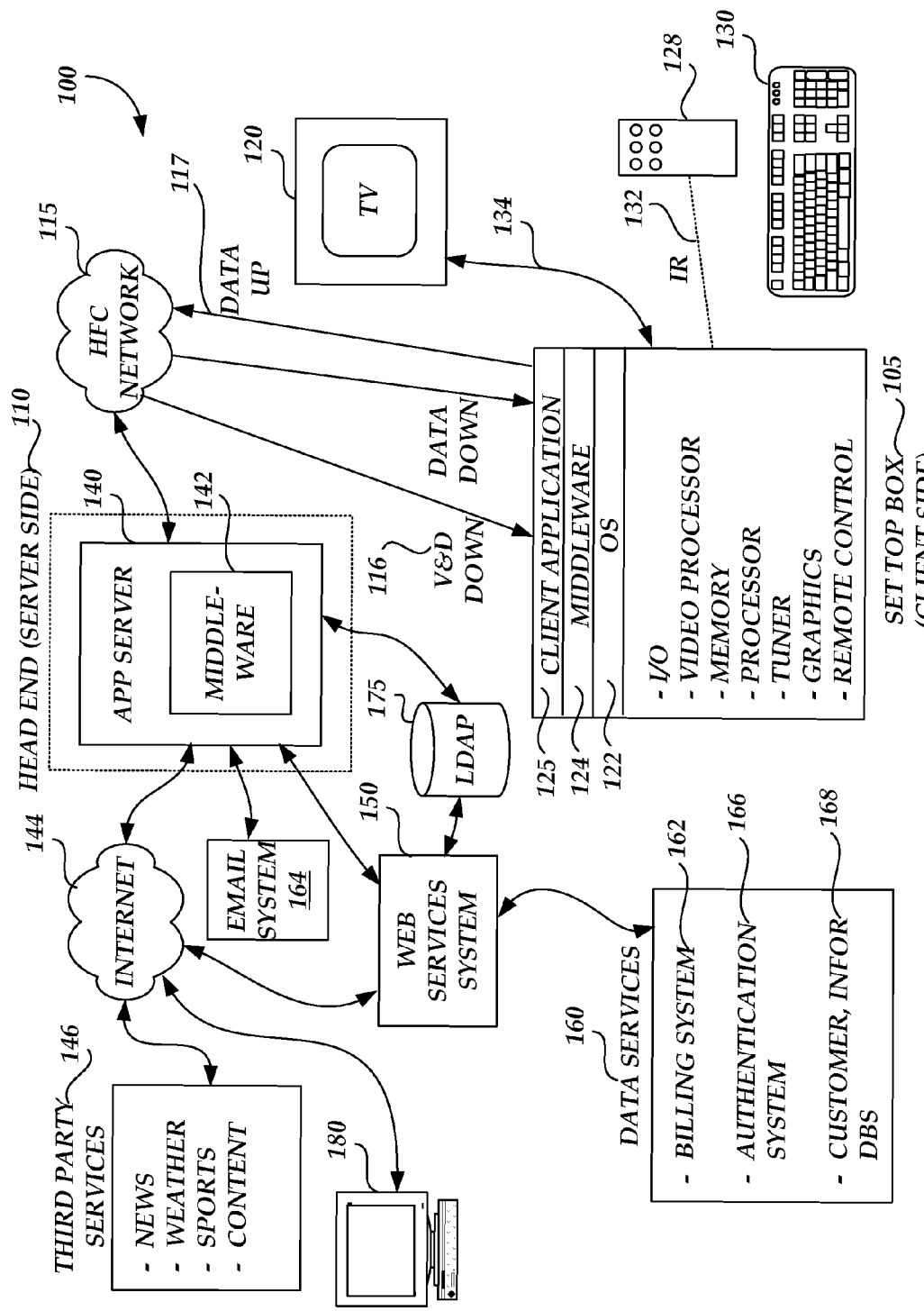
FIG. 1 is a simplified block diagram illustrating a cable television/services system architecture that serves as an exemplary operating environment for the present invention.

FIG. 1 is a simplified block diagram illustrating a cable television/services system 100 (hereafter referred to as "CATV") architecture that serves as an exemplary operating environment for the present invention. Referring now to FIG. 1, digital and analog video programming, information content and interactive television services are provided via a hybrid fiber coax (HFC) network 115 to a television set 120 for consumption by a cable television/services system customer. As is known to those skilled in the art, HFC networks 115 combine both optical fiber and coaxial cable lines. Typically, optical fiber runs from the cable head end 110 to neighborhoods of 500 to 2,000 customers. Coaxial cable runs from the optical fiber feeders to each customer. According to embodiments of the present invention, the functionality of the HFC network 115 allows for efficient bidirectional data flow between the client-side set-top box 105 and the server-side application server 140 of the present invention.

According to embodiments of the present invention, the CATV system 100 is in the form of a distributed client-server computing system for providing video and data flow across the HFC network 115 between server-side services providers (e.g., cable television/services providers) via a server-side head end 110 and a client-side customer via a client-side set-top box (STB) 105 functionally connected to a customer receiving device, such as the television set 120. As is understood by those skilled in the art, modem CATV systems 100 may provide a variety of services across the HFC network 115 including traditional digital and analog video programming, telephone services, high speed Internet access, video-on-demand, and information services.

On the client side of the CATV system 100, digital and analog video programming and digital and analog data are provided to the customer television set 120 via the set-top box (STB) 105. Interactive television services that allow a customer to input data to the CATV system 100 likewise are provided by the STB 105. As illustrated in FIG. 1, the STB 105 is a multipurpose computing device having a computer processor, memory and an input/output mechanism. The input/output mechanism receives input from server-side processes via the HFC network 115 and from customers via input devices such as the remote control device 128 and the keyboard 130. The remote control device 128 and the keyboard 130 may communicate with the STB 105 via a suitable communication transport such as the infrared connection 132. The remote control device 128 may include a biometric input module 129. The STB 105 also includes a video processor for processing and providing digital and analog video signaling to the television set 120 via a cable communication transport 134. A multi-channel tuner is provided for processing video and data to and from the STB 105 and the server-side head end system 110, described below.

The STB 105 also includes an operating system 122 for directing the functions of the STB 105 in conjunction with a variety of client applications 126. For example, if a client application 125 requires a news flash from a third-party news source to be displayed on the television 120, the operating system 122 may cause the graphics functionality and video processor of the STB 105, for example, to output the news flash to the television 120 at the direction of the client application 126 responsible for displaying news items.

Because a variety of different operating systems 122 may be utilized by a variety of different brands and types of set-top boxes, a middleware layer 124 is provided to allow a given software application to be executed by a variety of different operating systems. According to an embodiment of the present invention, the middleware layer 124 may include a set of application programming interfaces (API) that are exposed to client applications 126 and operating systems 122 that allow the client applications to communicate with the operating systems through common data calls understood via the API set. As described below, a corresponding middleware layer is included on the server side of the CATV system 100 for facilitating communication between the server-side application server and the client-side STB 105. According to one embodiment of the present invention, the middleware layer 142 of the server-side application server and the middleware layer 124 of the client-side STB 105 format data passed between the client side and server side according to the Extensible Markup Language (XML).

The set-top box 105 passes digital and analog video and data signaling to the television 120 via a one-way communication transport 134. The STB 105 may receive video and data from the server side of the CATV system 100 via the HFC network 115 through a video/data downlink 116 and data via a data downlink/uplink 117. The video/data downlink may include fiber-to-the-home (FTTH) and/or coaxial cable. Further, as will be explained below, a mini optical line termination (OLT) device according to an embodiment of the invention (not shown) is used to host GPON. A system that uses the mini optical line termination (OLT) device according to an embodiment of the invention includes passive optical network cards that are provided in a weather hardened device along with network cards, wherein the weather hardened device is positioned proximate to subscriber premises. Accordingly, passive optical network cards in a hub may be replaced with network uplink cards. The network uplink cards may be coupled to the weather hardened device in a ring configuration to provide signals to network cards in the mini optical line termination (OLT) device. The passive optical network cards in the mini optical line termination (OLT) device are configured in a ring to the subscribers.

The STB 105 may transmit data from the client side of the CATV system 100 to the server side of the CATV system 100 via the HFC network 115 via one data uplink. The data downlink/uplink 117, illustrated in FIG. 1, between the HFC network 115 and the set-top box 105 comprise "out of band" data links. As is understood by those skilled in the art, the "out of band" frequency range generally lies between zero and 54 megahertz.

According to embodiments of the present invention, data flow between the client-side set-top box 105 and the server-side application server 140 is typically passed through the "out of band" data links. Alternatively, an "in band" data carousel may be positioned in an "in band" channel into which a data feed may be processed from the server-side application server 140 through the HFC network 115 to the client-side STB 105. Operation of data transport between components of the CATV system 100, described with reference to FIG. 1, is well known to those skilled in the art.

Referring still to FIG. 1, the head end 110 of the CATV system 100 is positioned on the server side of the CATV system and includes hardware and software systems responsible for originating and managing content for distributing through the HFC network 115. As described above, a number of services may be provided by the CATV system 100, including digital and analog video programming, interactive television services, telephone services, video-on-demand services, targeted advertising, and provision of information content.

The application server 140 is a general-purpose computing system operative to assemble and manage data sent to and received from the client-side set-top box 105 via the HFC network 115. As described above with reference to the set-top box 105, the application server 140 includes a middleware layer 142 for processing and preparing data from the head end of the CATV system 100 for receipt and use by the client-side set-top box 105. For example, the application server 140 via the middleware layer 142 may obtain data from third-party services 146 via the Internet 140 for transmitting to a customer through the HFC network 115 and the set-top box 105. For example, a weather report from a third-party weather service may be downloaded by the application server via the Internet 144. When the application server 140 receives the downloaded weather report, the middleware layer 142 may be utilized to format the weather report for receipt and use by the set-top box 105.

According to one embodiment of the present invention, data obtained and managed by the middleware layer 142 of the application server 140 is formatted according to the Extensible Markup Language and is passed to the set-top box 105 through the HFC network 115 where the XML-formatted data may be utilized by a client application 126 in concert with the middleware layer 124, as described above. As should be appreciated by those skilled in the art, a variety of third-party services data, including news data, weather data, sports data and other information content may be obtained by the application server 140 via distributed computing environments such as the Internet 144 for provision to customers via the HFC network 115 and the set-top box 105.

According to embodiments of the present invention, the application server 140 obtains customer support services data, including billing data, information on customer work order status, answers to frequently asked questions, services provider contact information, and the like from data services 160 for provision to the customer via an interactive television session. As illustrated in FIG. 1, the services provider data services 160 include a number of services operated by the services provider of the CATV system 100 which may include data on a given customer.

A billing system 162 may include information such as a customer's name, street address, business identification number, Social Security number, credit history, and information regarding services and products subscribed to by the customer. According to embodiments of the present invention, the billing system 162 may also include billing data for services and products subscribed to by the customer for bill processing billing presentment and payment receipt.

A customer information database 168 may include general information about customers such as place of employment, business address, business telephone number and demographic information such as age, gender, educational level, and the like. The customer information database 168 may also include information on pending work orders for services or products ordered by the customer. The customer information database 168 may also include general customer information such as answers to frequently asked customer questions and contact information for various service provider offices/departments. As should be understood, this information may be stored in a variety of disparate databases operated by the cable services provider.

An electronic mail system 164 may contain information such as electronic mail addresses, high-speed Internet access subscription information and electronic mail usage data. An authentication system 166 may include information such as secure user names and passwords utilized by customers for access to network services. As should be understood by those skilled in the art, the disparate data services systems 162, 164, 166, 168 are illustrated as a collection of data services for purposes of example only. The example data services systems comprising the data services 160 may operate as separate data services systems, which communicate with a web services system (described below) along a number of different communication paths and according to a number of different communication protocols.

Referring still to FIG. 1, a web services system 150 is illustrated between the application server 140 and the data services 160. According to embodiments of the present invention, the web services system 150 serves as a collection point for data requested from each of the disparate data services systems comprising the data services 160. According to embodiments of the present invention, when the application server 140 requires customer services data from one or more of the data services 160, the application server 140 passes a data query to the web services system 150. The web services system formulates a data query to each of the available data services systems for obtaining any required data for a requesting customer as identified by a set-top box identification associated with the customer. The web services system 150 serves as an abstraction layer between the various data services systems and the application server 140. That is, the application server 140 is not required to communicate with the disparate data services systems, nor is the application server 140 required to understand the data structures or data types utilized by the disparate data services systems. The web services system 150 is operative to communicate with each of the disparate data services systems for obtaining necessary customer data. The customer data obtained by the web services system is assembled and is returned to the application server 140 for ultimate processing via the middleware layer 142, as described above.

Figure 2:
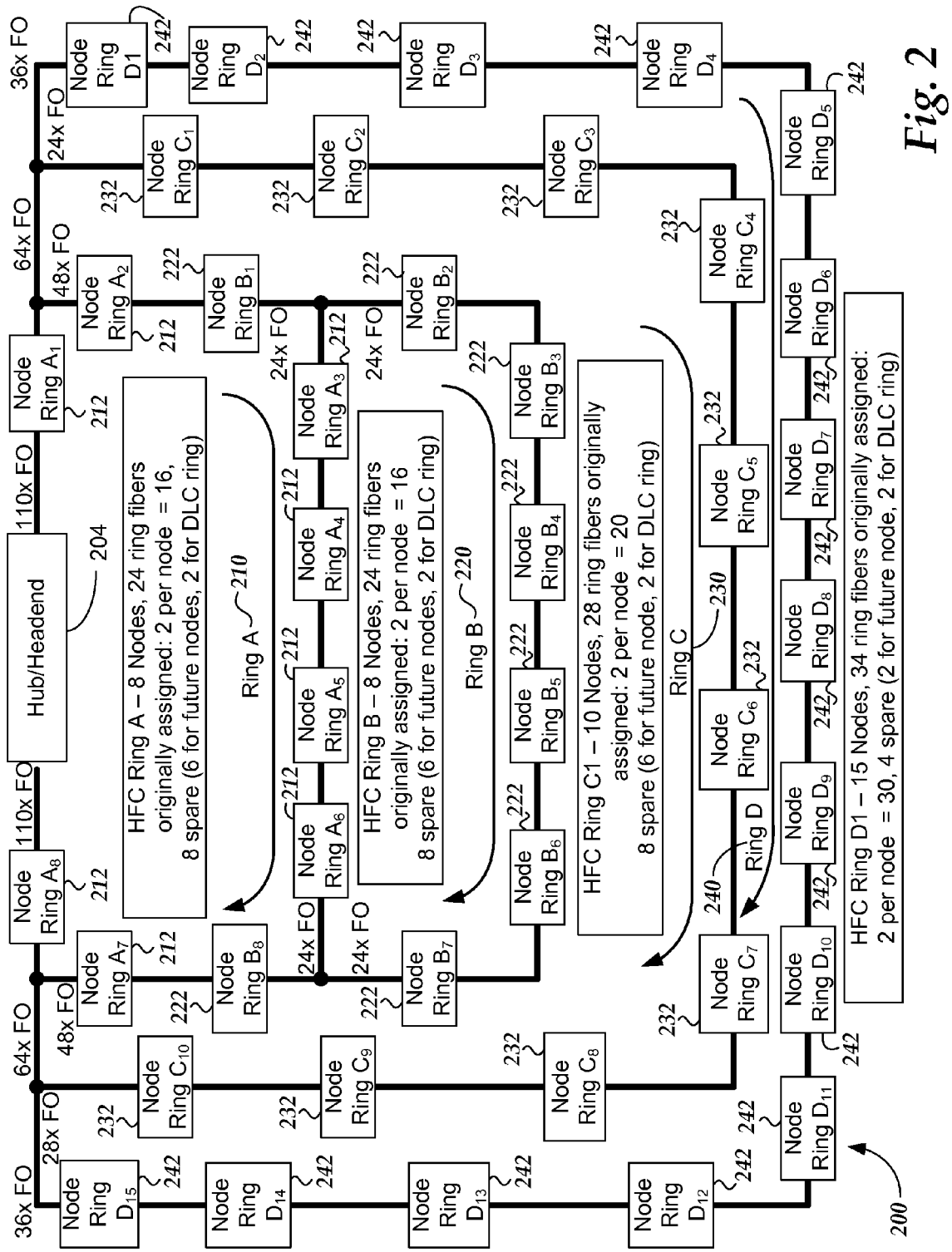
FIG. 2 illustrates a hybrid fiber coax (HFC) ring and ring arrangement.

FIG. 2 illustrates a hybrid fiber coax (HFC) ring and ring arrangement 200. In FIG. 2, there are 8 to 16 HFC nodes on a ring with headend 204. In HFC Ring A 210, there 8 nodes 212, $A_1$-$A_8$. There are 24 ring fibers originally assigned to Ring A 210. Each node has 2 fibers for a total of 16 fibers. That leaves 8 spares, wherein 6 are provided for future nodes and 2 are provided for the digital loop carrier (DLC) ring. In HFC Ring B 220, there also 8 nodes 222, $B_1$-$B_8$. Again, 24 ring fibers are originally assigned to Ring B 220. Each node has 2 fibers for a total of 16 fibers. That leaves 8 spares, wherein 6 are provided for future nodes and 2 are provided for the DLC ring.

In HFC Ring C 230, there 10 nodes 232, $C_1$-$C_{10}$. There are 28 ring fibers originally assigned to Ring C 230. Each node has 2 fibers for a total of 20 fibers. That leaves 8 spares, wherein 6 are provided for future nodes and 2 are provided for the DLC ring. In HFC Ring D 240, there 15 nodes 242, $D_1$-$D_{15}$. There are 34 ring fibers originally assigned to Ring D 240. Each node has 2 fibers for a total of 30 fibers. That leaves 4 spares, wherein 2 are provided for future nodes and 2 are provided for the DLC ring.

Figure 3:
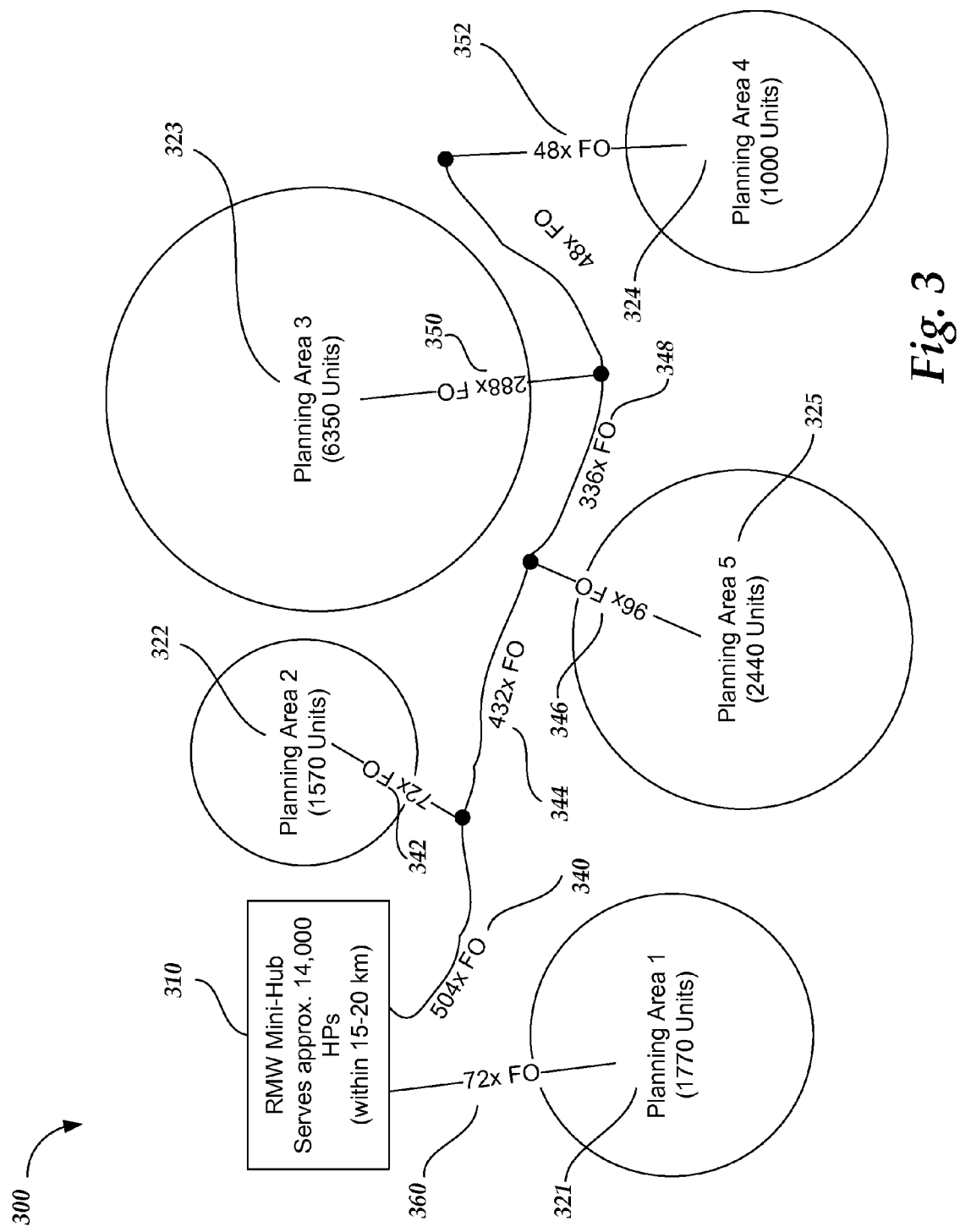
FIG. 3 illustrates a GPON architecture for the distribution of fibers in a geographic region.

FIG. 3 illustrates a GPON architecture 300 for the distribution of fibers in a geographic region. FIG. 3 shows a hub 310 configured to serve approximately 14,000 homes. The 14,000 homes may be grouped in 5 planning areas 320-325, planning areas 1 through 5. The GPON architecture is configured with the hub or a headend 310 in the neighborhood because the GPON limitation is 20 kilometers. To serve 14,000 homes, a very large number of fibers emanate from such a hub 310. In FIG. 3, 504 fibers 340 emanate from the hub 310. Planning Area 2 322 is assigned 72 fibers 342. Thus, 432 fibers 344 serve Planning Areas 3-5. Planning Area 5 325 is assigned 96 fibers 346. Thus, 336 fibers 348 serve Planning Areas 3-4. Planning Area 3 323 is assigned 288 fibers 350. Thus, 48 fibers 352 serve Planning Area 4 324. Planning Area 1 321 is assigned a separate 72 fibers 360. Accordingly, the GPON architecture 300 requires a large number of fibers.

Figure 4:
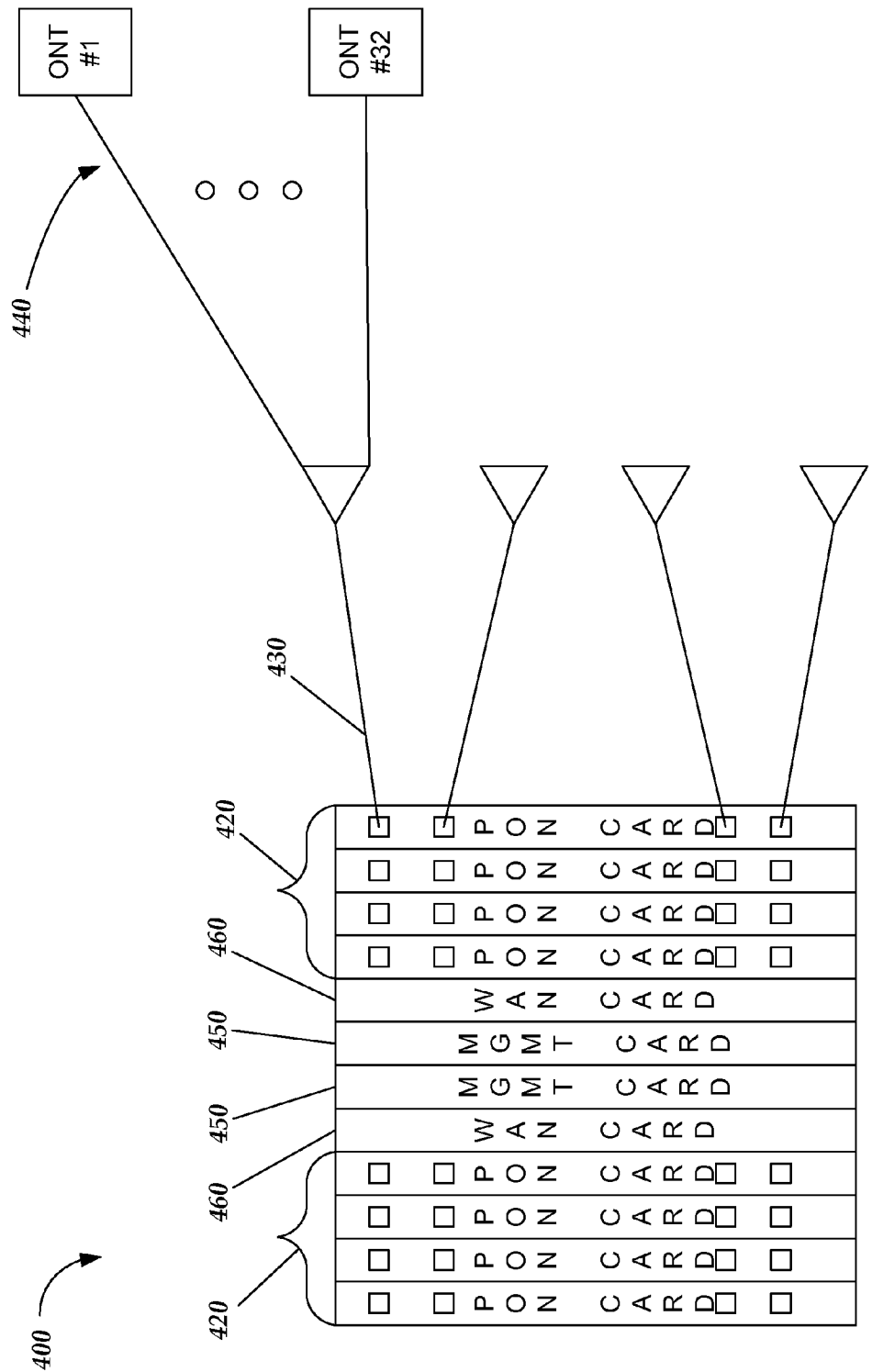
FIG. 4 shows a PON facility.

FIG. 4 shows a PON facility 400. In a traditional PON architecture, the PON cards 420 reside in a technical facility 400. A single fiber 430 out of a PON card can serve a total of 32 homes 440, i.e., 32 OLTs. Thus, for every 32 homes 440 in the field, a single fiber 430 is required. Thus, to serve a neighborhood of 14,000 homes, approximately 440 fibers would be needed, i.e., 32×440=14080. Each PON card 420 may be configured to support 4 fibers. In such a scenario, 110 PON cards would be necessary, i.e., 440/4=110. The PON facility 400 also includes management cards 450 and network cards 460.

Figure 5:
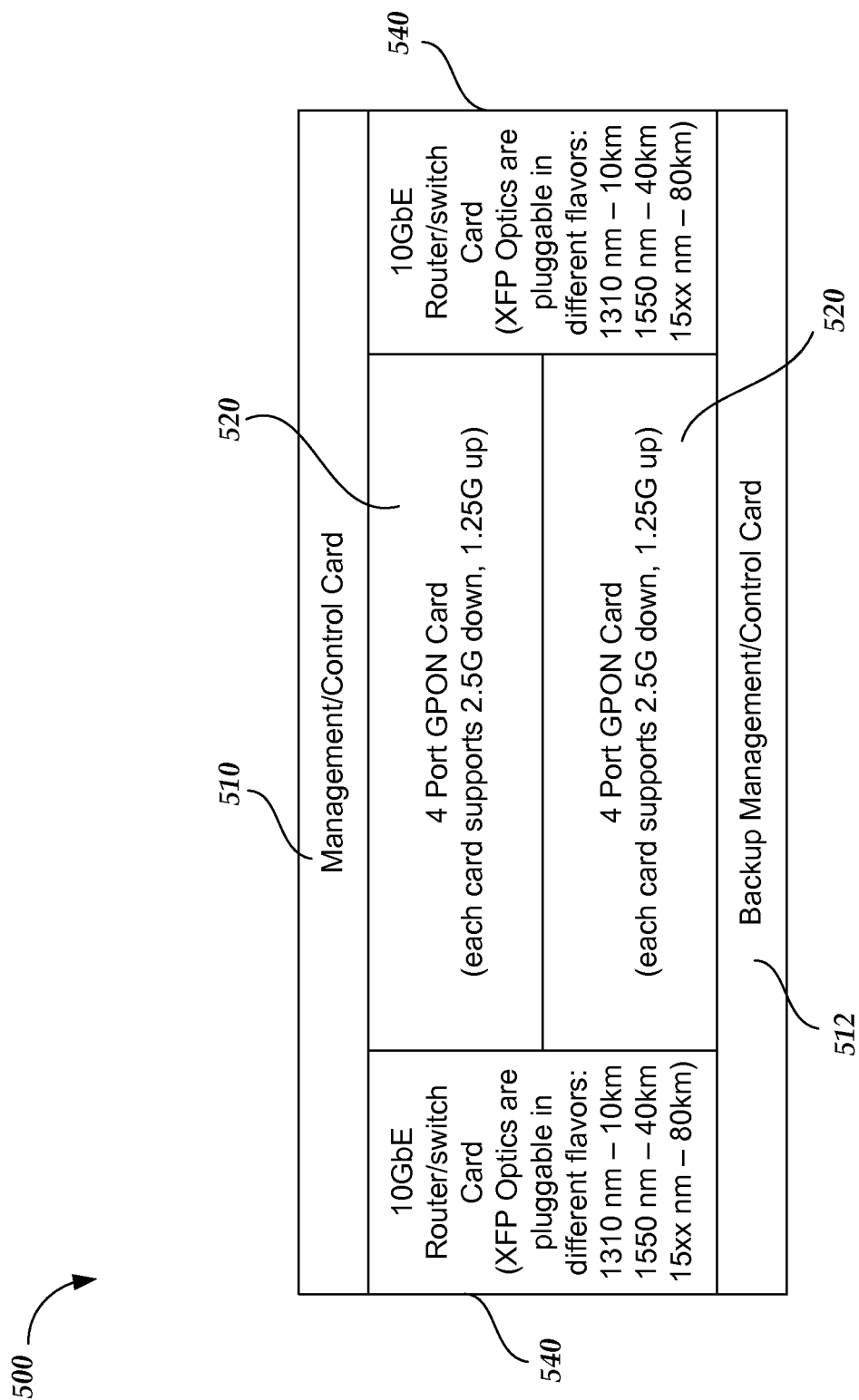
FIG. 5 illustrates a mini-OLT according to an embodiment of the invention.

FIG. 5 illustrates a mini-OLT 500 according to an embodiment of the invention. To provide the GPON architecture according to an embodiment of the invention, the existing GPON architecture has to be reduced. As shown in FIG. 5, a mini OLT 500 according to an embodiment of the invention includes a management card 510. A backup management card 512 is also provided. The mini-OLT shown in FIG. 5 includes two 4-port GPON cards 520. Each card 520 supports 2.5 Ghz downstream and 1.25 Ghz upstream. The mini-OLT 500 also includes 10 Gb Ethernet router/switch cards 540. The 10 Gb Ethernet router/switch cards 540 may support different wavelengths.

The mini OLT 500 may be configured to be similar to the size of an existing HFC node manufactured by various companies like Harmonic Inc, Motorola, Arris, etc. For example, a node may be approximately 24 inches by 18 inches by 24 inches. Thus, the mini OLT 500 is small enough to install in the field. The mini OLT 500 may also be configured with different cards to provide the needed functionality, e.g., a mini OLT may include six GPON cards 520. The two management or control cards 510, 512 monitor the health of the mini-OLT 500. The 4-port GPON cards may be 10 GPON, 40 GPON, etc. Accordingly, the concept may be extended to higher speeds as needed in the future. Each GPON card 520 is typically configured to serve 128 customers. Thus, the mini-OLT 500 is configured to serve up to 256 customers. In addition, a back plane is provided with non-blocking connections to the cards. Thus, the OLT according to an embodiment of the invention may be ringed together to provide protection.

Existing GPON architectures uses cards that are not environmentally hardened and thus are rated from 0° C. to 40° C. Further, existing GPON architectures use an optical line termination (OLT) that is located within a technical facility, e.g., a central office on a hub. Such OLTs takes up one-third to one-half of a seven foot telephone rack.

In contrast, the GPON cards 5220 are hardened to obtain a rating from minus 30° C. to 65° C. (−30 to +65° C.). Further, the need to provide air conditioning, fire protection, etc. is eliminated. Commercial power is already available at these locations so there is no need to build additional infrastructure to provide power.

In addition, rather than servicing 10,000 homes, the mini-OLT 500 is much smaller in size and scope and therefore serves only 1,000 homes. Further, the current architecture does not allow for any fail-safe protection per se. By installing four or more of the mini-OLT 500 according to an embodiment of the invention onto a fiber ring, additional fail-safe protection is provided. The basic GPON ring and ring architecture is overlaid with the mini OLTs 500 instead of nodes. Thus, the architecture does not require a significant amount of fiber.

Figure 6:
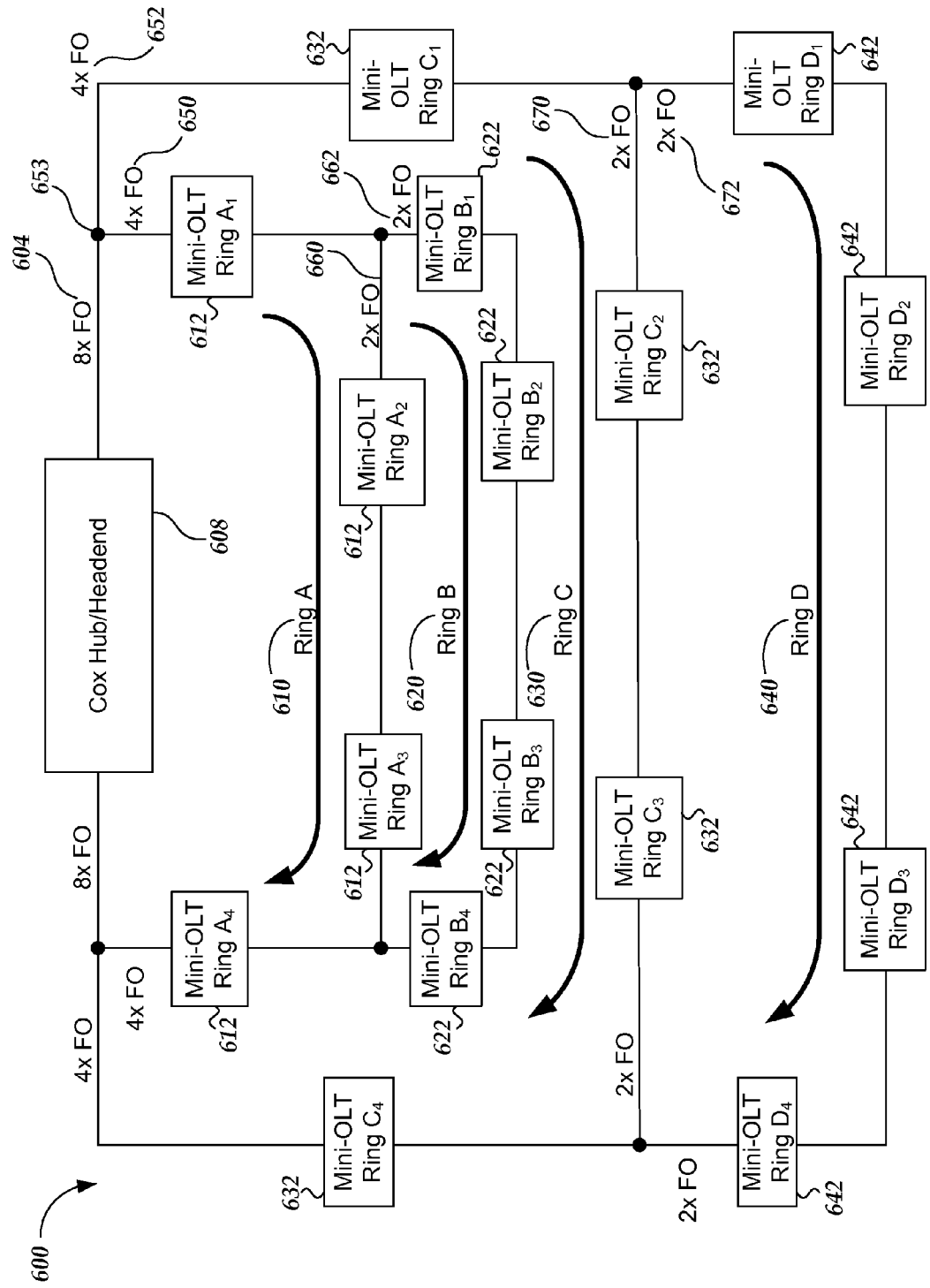
FIG. 6 illustrates a hybrid fiber coax (HFC) ring and ring arrangement according to an embodiment of the invention.

FIG. 6 illustrates a hybrid fiber coax (HFC) ring and ring arrangement 600 according to an embodiment of the invention. In FIG. 6, only 8 fibers 604 exit the headend 608. In Ring A 610, there are 4 mini-OLTs 612, Mini-OLT Ring $A_1$-$A_4$. In Ring B 620, there are 4 mini-OLTs 622, Mini-OLT Ring $B_1$-$B_4$. In Ring C 630, there are 4 mini-OLTs 632, Mini-OLT Ring $C_1$-$C_4$. In Ring D 640, there are 4 mini-OLTs 642, Mini-OLT Ring $D_1$-$D_4$.

The 8 fibers 604 exit the headend 608 and split into two paths 650, 652 of 4 fibers each at a ring junction 653. After Mini-OLT Ring $A_1$, the four fibers 650 split into two paths of two fibers each such as each pair of fibers 660, 662. After Mini-OLT Ring $C_1$, the four fibers 652 split into two paths of two fibers each such as each pair of fibers 670, 672. With 16 mini OLTs, 4000 homes may be serviced. In contrast, a traditional GPON architecture would require a minimum of 64 fibers in each direction. Moreover, from a transport perspective, if a fiber cut occurs today, thousands of GPON customers may lose service. However, the GPON according to an embodiment of the invention would enable customers to survive in the event of a fiber cut without an outage because an alternate path would be available to communicate back to the headend.

Figure 7:
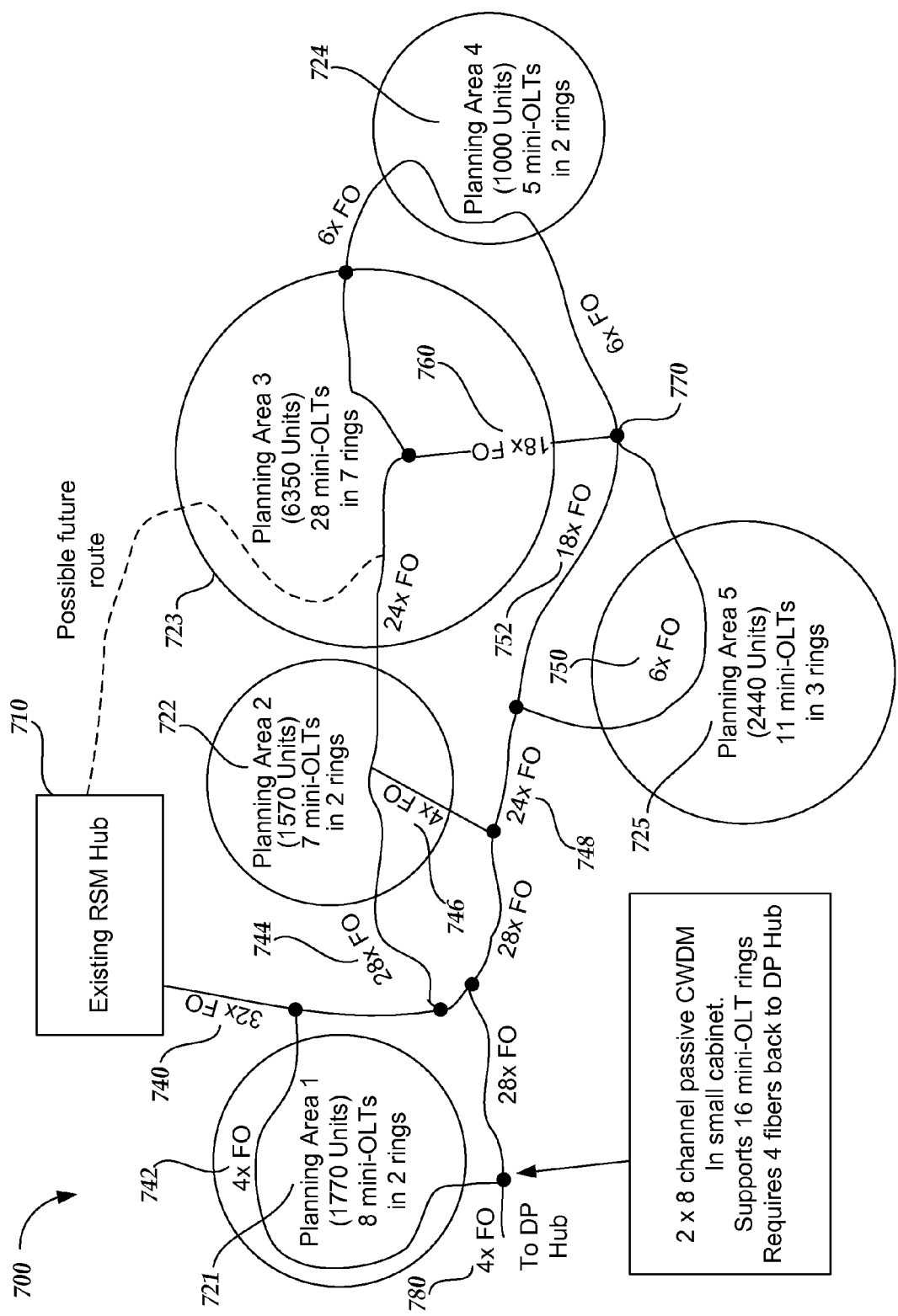
FIG. 7 illustrates a GPON architecture for the distribution of fibers in a geographic region according to an embodiment of the invention.

FIG. 7 illustrates a GPON architecture 700 for the distribution of fibers in a geographic region according to an embodiment of the invention. FIG. 7 shows a hub 710 configured to serve approximately 14,000 homes. The 14,000 homes may be grouped in 5 planning areas 721-725, Planning Areas 1 through 5. In FIG. 7, only 32 fibers 740 emanate from the hub 710. Planning Area 1 721 is assigned 4 fibers 742. Thus, 28 fibers 744 serve Planning Areas 2-5 722-725. Planning Area 2 722 is assigned 4 fibers 746. Thus, 24 fibers 748 serve Planning Areas 3-5. Planning Area 5 723 is assigned 6 fibers 750. Thus, 18 fibers 752 remain. However, at node 770, the 6 fibers 750 are fed back to the loop and can be used to service Planning Area 4 724. That leaves 18 fibers 760 for servicing Planning Area 3 721. In the event fiber back to the hub is choked, passive, hardened 8 channel CWDM filters can be used in conjunction with 10 GbE transponders on the mini-OLT closest to the hub. Only four fibers back to the hub is required to support 16 mini-OLT rings 780. Accordingly, by arranging the system in a ring configuration, two fibers support 1000 homes rather than the traditional 64 homes. Thus, the number of required fibers is reduced.

Figure 8:
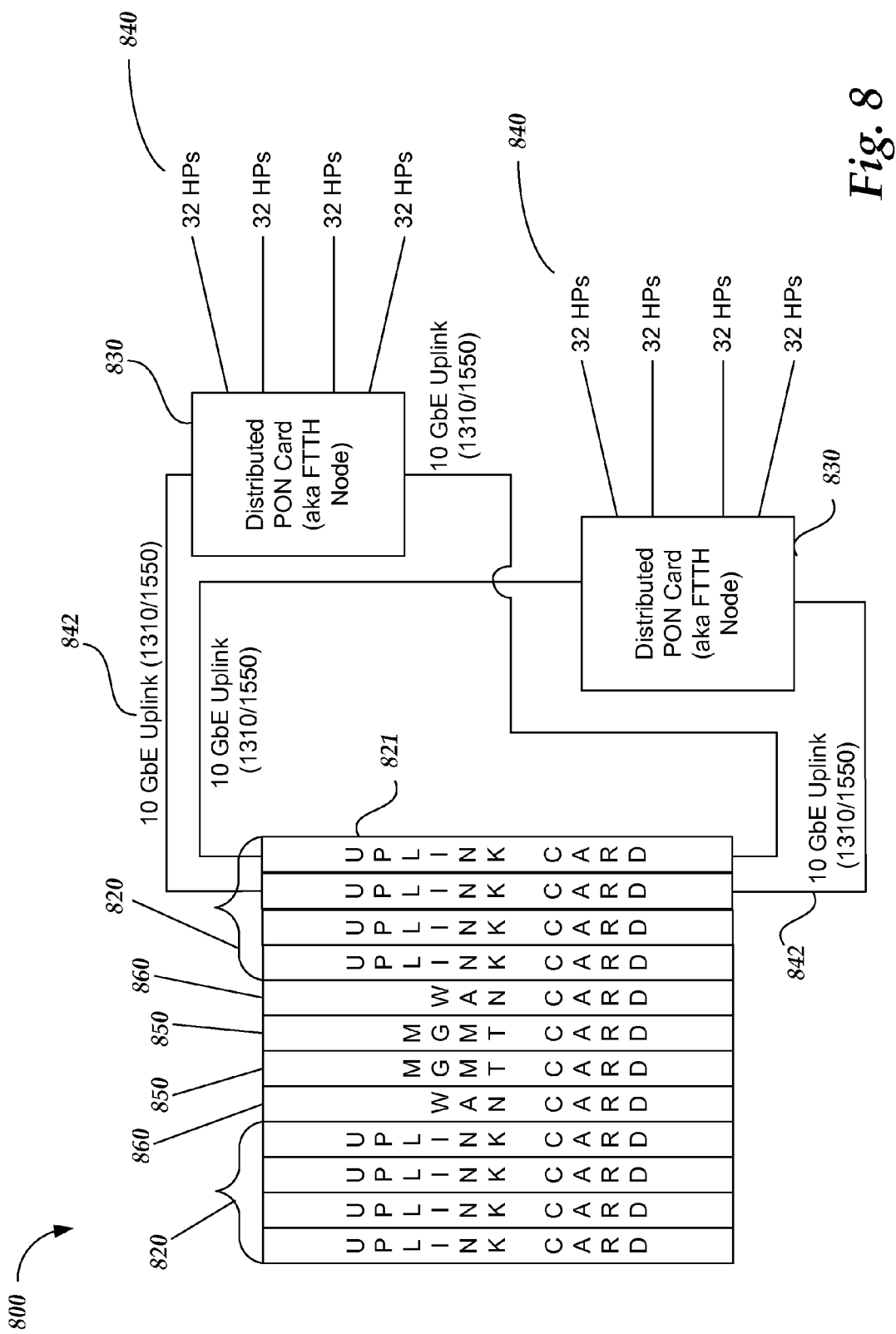
FIG. 8 shows a GPON architecture according to an embodiment of the invention.
Figure 10:
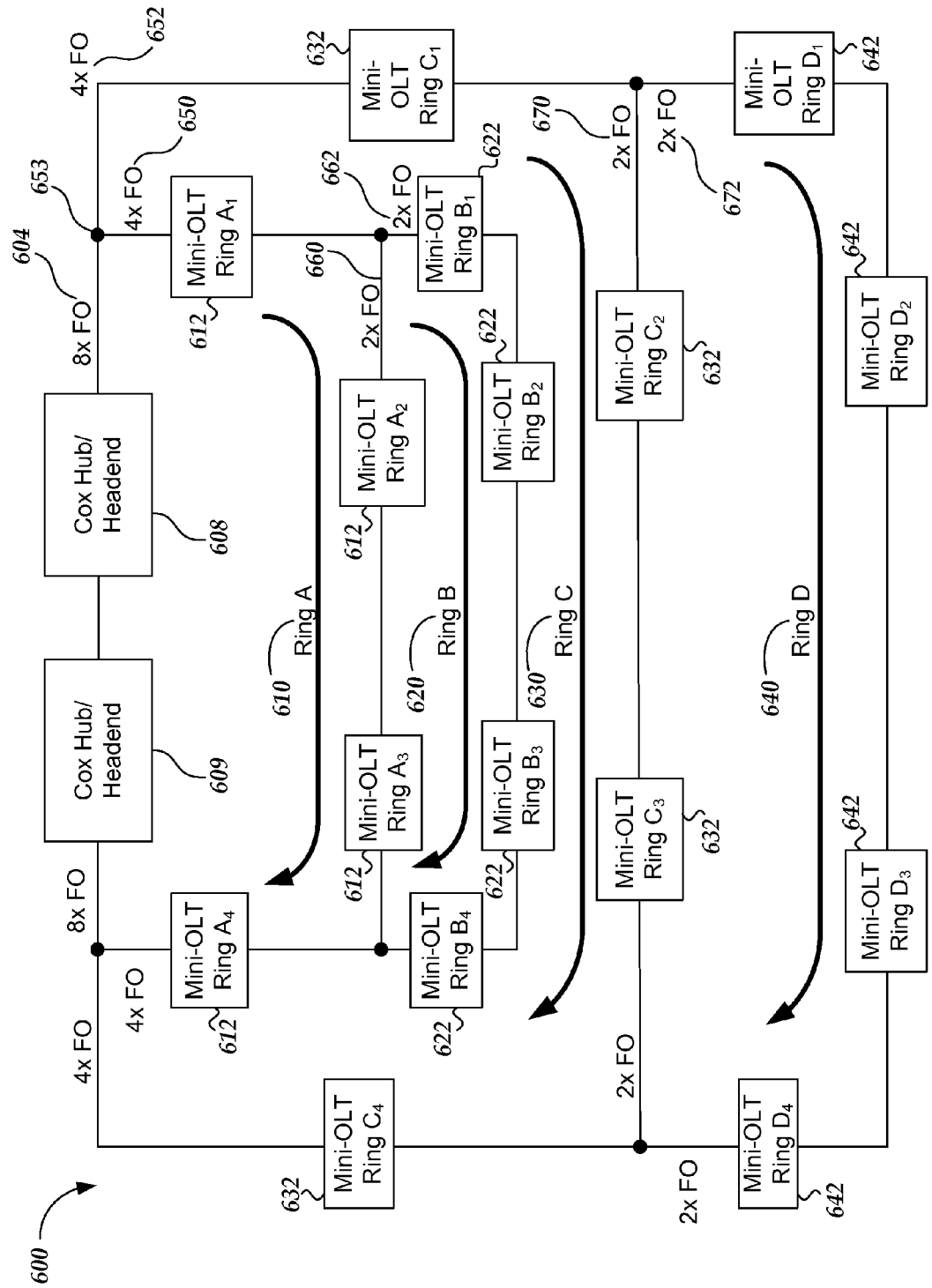
FIG. 10 illustrates a HFC ring and ring arrangement with a pair of hubs according to an embodiment of the invention.

FIG. 8 shows a GPON architecture 800 according to an embodiment of the invention. In the GPON architecture 800, uplink cards 820 are provided. A first uplink card 821 is coupled to the distributed PON card 830, i.e., a fiber-to-the-home (FTTH) node. The distributed PON card 830 services 128 residences 840. The GPON architecture 800 also includes management cards 850 and network cards 860. In the GPON architecture 800, the PON cards 830 are half a mile from the customers. Thus, fiber from that the facility to the homes is needed, but the fiber from the homes back to the technical facility is reduced. Further, the electronics are moved closer to the customer. By placing the customers on a ring architecture, the amount of fiber needed back to the technical facility is reduced. For additional diversity/protection, since these are essentially 10 GbE data pipes 842 back to a data router, i.e., uplink card 820, there is no reason that both sides of the ring have to go back to the same hub. A mini-OLT ring could come back to two different hubs such as hubs 608 and 609 as shown in FIG. 10. In addition, the connection between GPON cards 830 and router/switch cards 820 are all via a 100 G non-blocking backplane. This allows future swap-out of GPON cards 830 to 10 GPON cards and the switch/router cards 820 to 40 G cards.

Figure 9:
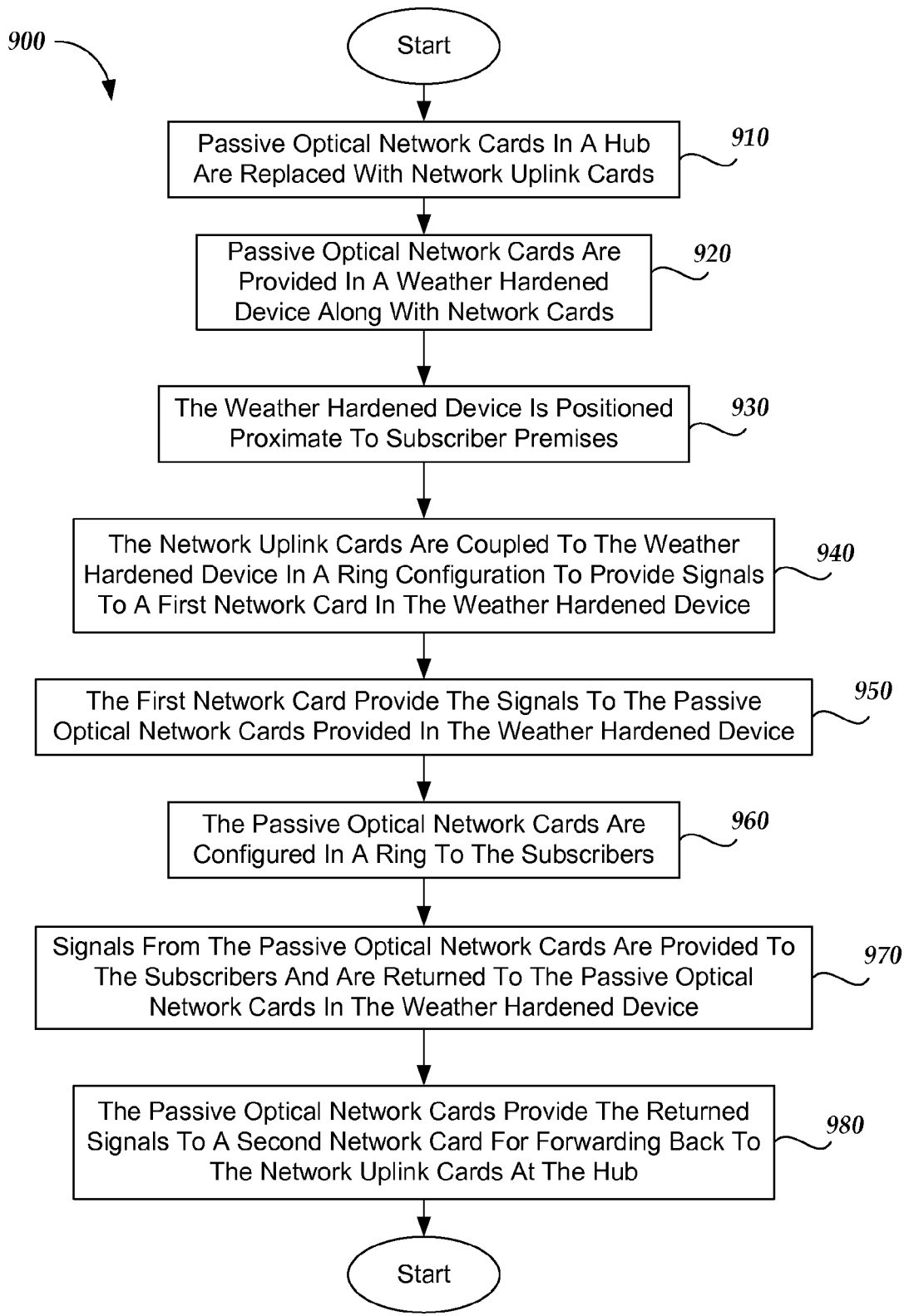
FIG. 9 is a flow chart of a method for providing a ring in ring passive optical network system for fiber to the home using a reduced number of fibers according to an embodiment of the invention.

FIG. 9 is a flow chart 900 of a method for providing a ring in ring passive optical network system for fiber to the home using a reduced number of fibers according to an embodiment of the invention. In FIG. 9, passive optical network cards in a hub are replaced with network uplink cards 910. Passive optical network cards are provided in a weather hardened device along with network cards 920. The network cards may be a 10 Gigabit Ethernet router or switch. The weather hardened device is positioned proximate to subscriber premises 930. The network uplink cards are coupled to the weather hardened device in a ring configuration to provide signals to a first network card in the weather hardened device 940. The first network card provides the signals to the passive optical network cards provided in the weather hardened device 950. The passive optical network cards are configured in a ring to the subscribers 960. Signals from the passive optical network cards are provided to the subscribers and are returned to the passive optical network cards in the weather hardened device 970. The passive optical network cards provide the returned signals to a second network card for forwarding back to the network uplink cards at the hub 980.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A mini-optical line termination (OLT), comprising:
at least one management card for providing control and management functions;
a plurality of network cards having a predetermined number of ports, the plurality of network cards configured to support a predetermined number of subscribers by providing a gigabit passive optical network to the subscribers; and
at least one network device, coupled to an upstream device and the plurality of network cards, the network device configured to control the forwarding of data between the upstream device and the subscribers, wherein signals from the network device are provided to the subscribers and return signals from the subscribers are returned to the network device, and wherein the return signals from the subscribers are then provided to a network card of the plurality of network cards via the network device for forwarding to the upstream device.

2. The mini-OLT of claim 1, wherein the plurality of network cards comprises two 4-port GPON cards supporting downstream and upstream flow of signals.

3. The mini-OLT of claim 2, wherein the two 4-port GPON cards comprise 10 GPON cards.

4. The mini-OLT of claim 2, wherein the two 4-port GPON cards comprise 40 GPON cards.

5. The mini-OLT of claim 1, wherein the at least one network device comprises at least one 10 Gb Ethernet router card.

6. The mini-OLT of claim 1, wherein the at least one network device comprises at least one 10 Gb Ethernet switch card.

7. The mini-OLT of claim 1, wherein the at least one network device is configured to support a plurality of wavelengths.

8. The mini-OLT of claim 1 further comprises a back plane providing non-blocking connections between the at least one management card, the plurality of network cards and the at least one network device.

9. The mini-OLT of claim 1 further comprising a weather hardened enclosure, the at least one management card, the plurality of network cards and the at least one network device being disposed within the weather hardened enclosure.

10. The mini-OLT of claim 9, wherein the weather hardened enclosure is temperature hardened to operate from −30° C. to 65° C.

11. A method for providing a ring-in-ring passive optical network system for fiber to the home, comprising:
- replacing passive optical network cards in a hub with network uplink cards;
- providing passive optical network cards in a weather hardened device along with network cards;
- positioning the weather hardened device proximate to subscriber premises;
- coupling the network uplink cards to the weather hardened device in a ring configuration to provide signals to a first network card in the weather hardened device;
- providing the signals to the passive optical network cards provided in the weather hardened device via the first network card;
- arranging the passive optical network cards in a ring to the subscribers;
- providing signals from the passive optical network cards to the subscribers;
- returning signals from the subscribers to the passive optical network cards in the weather hardened device; and
- providing, from the passive optical network cards, the signals returned from the subscribers, to a second network card for forwarding back to the network uplink cards at the hub.

* * * * *